Nov. 23, 1971 W. J. KORENICKI 3,621,717
TUBING CONNECTOR FOR PNEUMATIC READOUT SYSTEMS
Filed Sept. 15, 1969 2 Sheets-Sheet 1
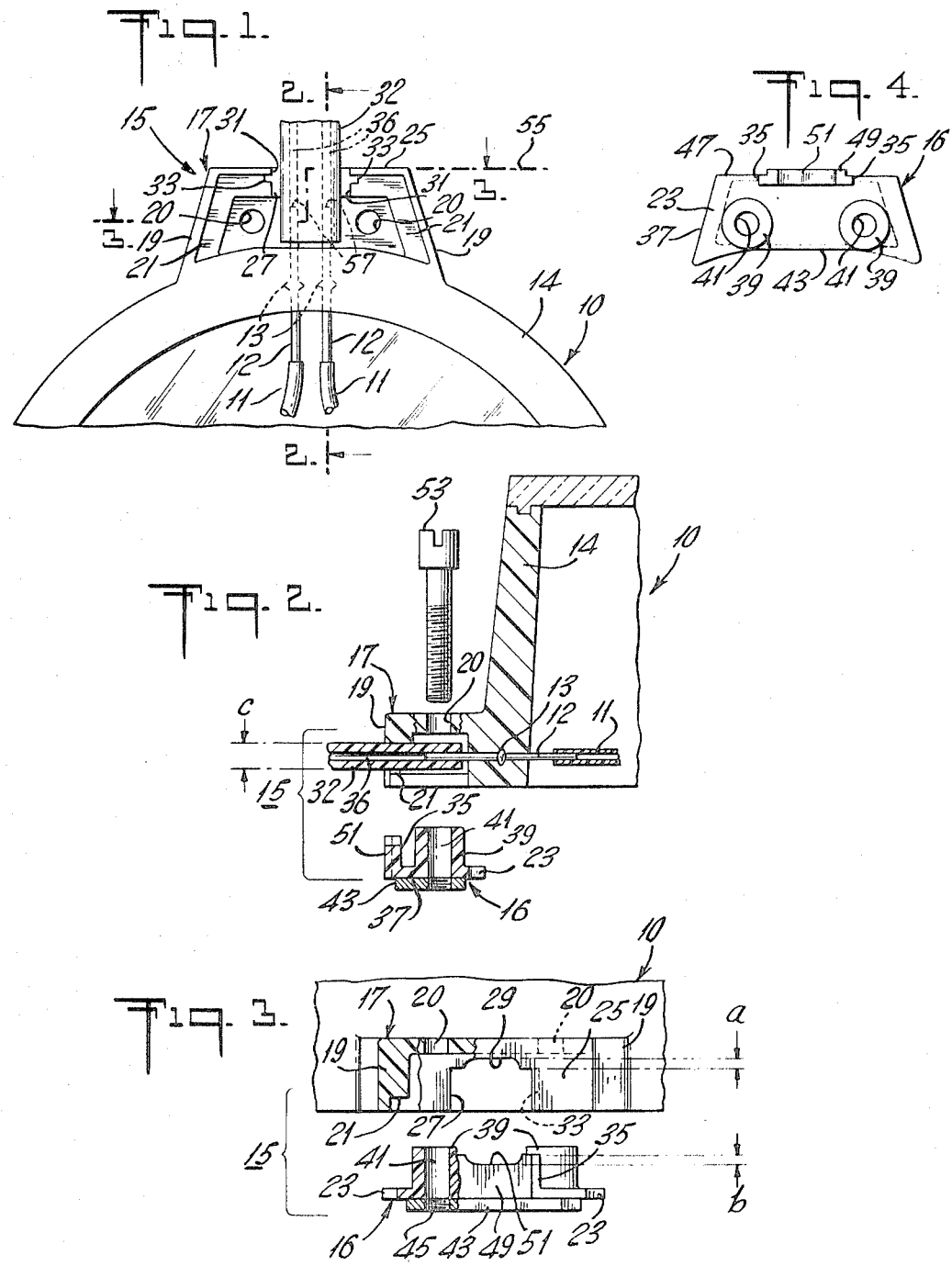
INVENTOR
WILLIAM JOHN KORENICKI
BY
Lerner, David & Behr
ATTORNEYS Nov. 23, 1971   W. J. KORENICKI   3,621,717
TUBING CONNECTOR FOR PNEUMATIC READOUT SYSTEMS
Filed Sept. 15, 1969   2 Sheets-Sheet 2
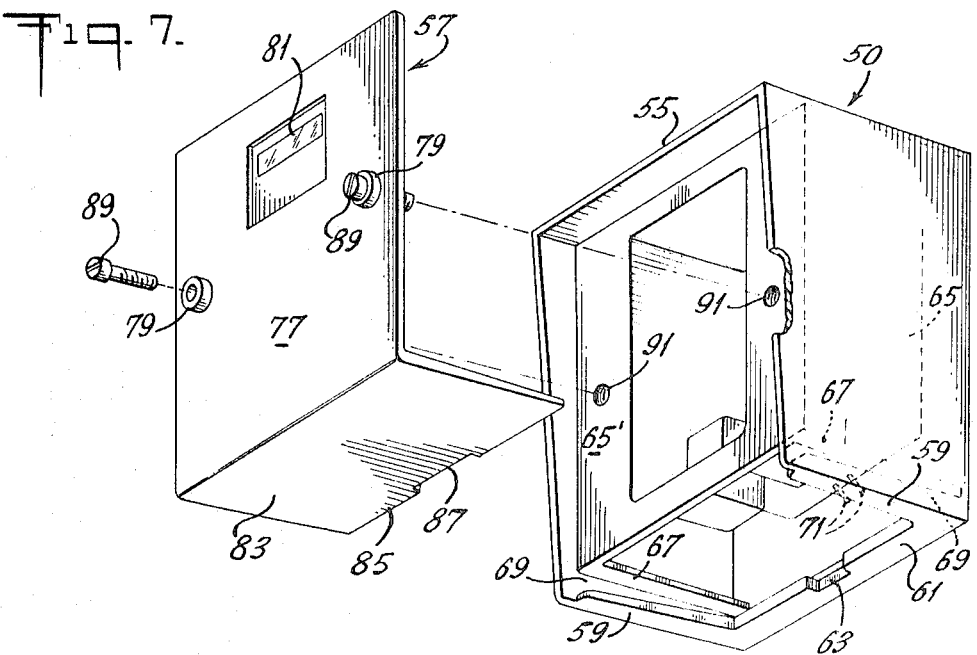
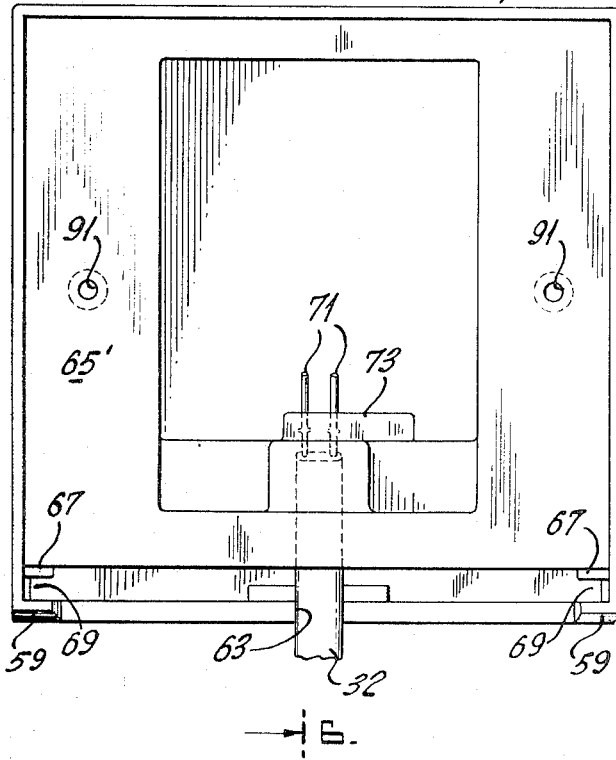
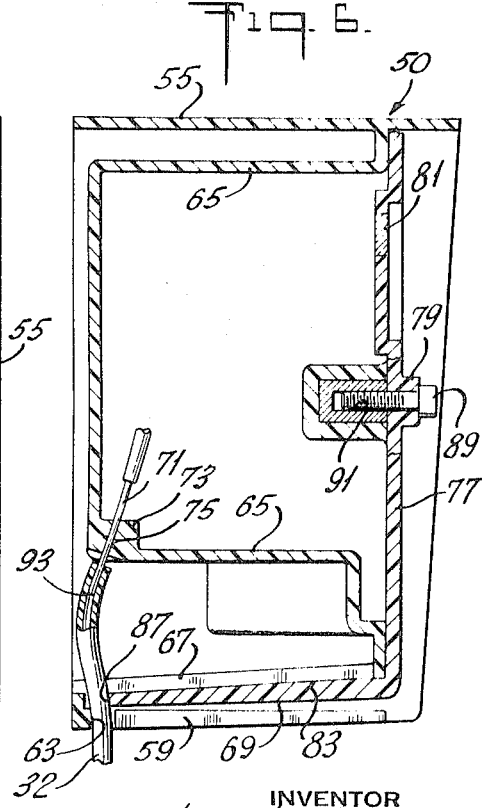
INVENTOR
WILLIAM JOHN KORENICKI
BY
Lerner, David, & Behr
ATTORNEYS 3,621,717
TUBING CONNECTOR FOR PNEUMATIC READOUT SYSTEMS
William John Korenicki, Linden, N.J., assignor to Gamon-Calmet Industries, Inc., Newark, N.J.
Filed Sept. 15, 1969, Ser. No. 857,818
Int. Cl. G01f 15/18; F16l 33/22
U.S. Cl. 73—272
19 Claims

ABSTRACT OF THE DISCLOSURE

There is provided a novel type of connecting arrangement for simply and effectively establishing fluid communication between various portions of a fluidic system. Although the arrangement has broad application, it is specifically adapted for conveying fluid pulses between a fluid meter (such as a water meter) and a remotely located register which provides an indication of flow through the meter. The connecting arrangement comprises one or more hollow pins inserted through a wall of the casing into which it is desired to convey fluidic flow; a fluid carrying conduit connected to a portion of the pin which extends externally of the casing; and clamping means located beyond the outermost extremity of the pin for maintaining the connection of the conduit and the pin and at the same time for preventing mechanical stress form being applied to the pin.

BACKGROUND OF THE INVENTION

In the operation of certain metering devices, for example water meters and the like, it is often desirable to read the meter at a location remote from the meter itself. Such remote metering is achieved in one system, by transmitting generated pneumatic pulses representative of water flow from the meter to a remotely located register box within which is provided the necessary fluid responsive system for converting the pulses to mechanical energy which in turn is utilized to continually advance a counter. Such a system is illustrated for example in U.S. Patent 3,352,488 issued Nov. 14, 1967, to George B. Green, the disclosure of which is incorporated herein by specific reference thereto.

To convey the fluidic pulses between the meter and the register box, it has been customary to employ a flexible metal protective conduit through which is passed a pair of plastic tubes. The opposite ends of the metal conduit are secured to the meter and the register box, and the plastic tubes are passed through the respective walls of the meter and register box to appropriate connecting points in the operative fluid systems situated in each.

Despite the prevalence of the above described system, it has many disadvantages which make it complex, expensive, difficult to install and difficult to service. For example, the basic assembly of two fluid carrying tubes housed within an exterior metallic flexible sheath is cumbersome, unnecessarily expensive, and requires a great deal of time to "snake" the interior tubes through the metal sheath. Furthermore, to secure the ends of the metal conduit to the meter casing and register box, requires a complex arrangement including a lock nut positioned on the inside of the respective casing, a spring support arrangement, and a number of hand crafted cement joints.

Equally as important, is the complexity of installation which is dictated by such an arrangement wherein the inner fluid carrying tubes must pass through the two casings into direct operational connection with the respective internally located fluid responsive systems. Thus, it will be appreciated that in this type of system neither the meter nor the remotely located register box can be manufactured as a self contained "off the shelf" item, since it is not until the final installation, which takes place in the field, that the fluid carrying conduits for establishing communication therebetween are finally passed into the respective casings and secured to the internal apparatus of each. It might be noted that one attempt to eliminate this problem has been to construct both the meter portion of the system and the register portion of the system with pre-connected lengths of the cable-conduit assembly. However, and although this procedure allows the manufacture to pre-assemble the register boxes and the meters, it necessarily dictates the utilization of an intermediate junction box into which the free ends of the preconnected lengths of cable-conduit assembly must be inserted before the system is operative. As may be appreciated, the proper connection of the interior fluid carrying tubes and the external flexible metallic sheath within such a junction box is a relatively complex time consuming field operation which requires the presence of rather well trained personnel.

SUMMARY OF THE INVENTION

In contradistinction to the prior art, the connecting arrangement of the instant invention provides a simple, inexpensive, easy to install arrangement for establishing fluid communication between various portions of a fluidic system. As the description hereof unfolds, it will be apreciated that the connecting arrangement hereof is applicable to a variety of systems wherein it is desirable to convey fluid through a walled surface or housing. However, because of the attendant advantages which have been derived therefrom, the instant invention will be described in the context of a remote readout system for a water meter or the like.

Thus, in its preferred form, the system of the instant invention is utilized to convey pneumatic pulses representative of water flow from a water meter to a remotely located register box which is responsive to the pneumatic pulses to provide a visual indication of such flow. As such, it is thereby necessary to transmit the pneumatic pulses generated within the meter casing to a location within the remotely located register box. To accomplish this pneumatic transmission, the connecting arrangement of the instant invention includes one or more hollow pins (the number of which depend on the particular pneumatic system empolyed) sealingly inserted through a wall of the meter casing and a wall of the register casing. From the inner extremities of the hollow pins, appropriate internal tubing can be provided for pneumatic connection to the respective operative apparatus (such as the bellows of the aforementioned Green patent) located within the respective housing, such that both the meter portion of the system and the register portion of the system can be pre-assembled as self-contained units. To establish the fluid communication between the two housings, there is provided a fluid carrying flexible conduit having one or more passageways therethrough (again depending on the fluidic system employed) with the ends of such conduit being conveniently slipped onto i.e., telescopically received, by the extremities of the aforementioned pins which extend out of the respective casings. Finally, at each end of the flexible conduit, there is provided clamping means located beyond the outermost extremity of the respective hollow pins for maintaining the connection of the conduit and the pin and at the same time for preventing mechanical stresses from being applied to the pins.

As a particularly advantageous feature of the instant invention, the aforementioned hollow pins are preferably ultra-sonically welded in the walls through which they pass, and are additionally provided with a circumferential irregularity which has the dual function of establishing a desired seal and preventing lateral displacement of such pins.

As a further feature of the instant invention, the aforementioned clamping means situated at each end of the fluid carrying conduit are provided with a certain degree of overclamping so designed as to actually dig into the conduit and positively prevent its axial displacement with respect to the pins upon which the ends thereof are carried.

Accordingly, it is an object of the instant invention to provide a connecting arrangement for conveying fluid through a walled surface or housing which arrangement includes at least one pin embedded in the walled surface or housing; a fluid carrying conduit connected at one end thereof to a portion of such pin which extends externally of the walled surface or housing; and clamping means located beyond the outermost extremity of the pin for maintaining the connection of the conduit and the pin and at the same time for preventing mechanial stresses from being applied to such pin.

Another object of the instant invention is to provide such an arrangement wherein the aforementioned pin is ultrasonically inserted through the aforementioned walled surface or housing and additionally includes a circumferential irregularity which helps establish a desired seal and at the same time prevents lateral displacement thereof.

Yet another object of the instant invention is to provide such a connecting arrangement wherein the aforementioned clamping means includes an overclamping feature which positively prevents the lateral displacement of the fluid carrying conduit with respect to the pin upon which the end of the conduit is connected.

Still another object of the instant invention is to provide such a connecting arrangement which has application in any situation where it is desirable or necessary to convey fluid through a walled surface or into a housing or casing defined in part by such walled surface.

Yet another object of the instant invention is to provide such a connecting arrangement which has particular application in a remotely located pneumatic readout system for water meters and the like wherein it is necessary to convey fluid pulses representative of water flow from the meter to a remotely located register box which has the necessary apparatus for converting such pneumatic pulses to mechanical energy utilized in turn to drive a readable counter.

These and other objects of the instant invention may be had by referring to the following specification and drawings in which:

FIG. 1 is a partial bottom view of a meter casing employing a connecting arrangement of the instant invention;

FIG. 2 is an exploded side view of the meter casing of FIG. 1 taken along the lines 2—2 thereof;

FIG. 3 is an exploded, part-sectional, elevational view of the connecting arrangement of FIG. 1 taken along the arrows 3—3 thereof;

FIG. 4 is a plan view of a portion of the connecting arrangement illustrated in FIGS. 2 and 3;

FIG. 5 is a front view of a register casing with the cover removed employing the teachings of the instant invention;

FIG. 6 is a side sectional view of the register casing of FIG. 5 and additionally showing the cover therefor; and FIG. 7 is an exploded perspective view of the register casing of FIGS. 5 and 6.

Turning to the figures, and with specific reference at the present time to FIGS. 1 and 6, it was noted previously that the instant invention has been found particularly applicable to, and would be described with respect to a pneumatic system for remotely reading a water meter or the like. Thus, in FIG. 1, the numeral 10 broadly designates part of a meter box within which is provided the necessary conventional apparatus (not shown) for measuring rate of flow and for producing pneumatic pulses representative of same in the tubular conduits 11. As will be described in greater detail, the tubular conduits 11 are connected to hollow pins 12 by which the pneumatic pulses representative of rate of flow may be transmitted externally of the meter 10 to a fluid carrying conduit 32.

The opposite end of the conduit 32 is connected in similar fashion to hollow pins 71 located in the remotely located register box broadly designated 50 in FIG. 6. The register box 50 includes conventional apparatus (not shown) internally thereof for converting such pneumatic pulses to mechanical energy which in turn continually advance a counter (not shown) which will thereby provide a visual indication of the rate of flow taking place in the meter 10.

Since the instant invention is in no way concerned with either a water meter per se or the apparatus for generating or responding to pneumatic pulses representative of rate of flow, a detailed description of such prior art apparatus is unnecessary in the instant specification. For the sake of completeness, it may be stated that although many systems are possible, one may conveniently employ the meter and closed loop bellows system of the aforementioned Green Pat. 3,352,488 for generating and responding to the pneumatic pulses which are conveyed through the arrangement of the instant invention.

Returning now to FIGS. 1 and 2, the upper portion of the meter box 10 includes a frustoconical walled portion 14 provided on the upper surface thereof with a transparent cover. Passing through the walled portion 14 there are inserted one or more of the hollow pins 12, two of such pins being illustrated in FIG. 1. It will be appreciated that the number of pins 12 employed in a particular system actually depends on the pneumatic system involved. In the aforementioned closed loop system of the Green patent, two such pins 18 are required. In a system which requires only one fluid path, only one such pin 12 would be required.

As shown in the drawings, the pins 12 have a circumferential irregularity 13 so located as to improve the mechanical retention of the pins within the walled portion 14. At the same time, such irregularity helps to prevent air leakage from developing around the circumference of the pin.

In the preferred method of manufacture, the pins 12 are embedded in the walled portion 14 (and in the walled portion 73 of the register box 50 of FIG. 6) by an ultrasonic welding technique in which the pins are inserted in previously drilled under-dimensioned apertures which become somewhat pliable after ultrasonic treatment. Regardless of the method of insertion, the pins are so situated that a portion thereof extends within the meter (for connection to conduits 11) and a portion thereof extends externally of the meter 10 for connection to the flexible fluid carrying conduit 32.

The conduit 32 is in the preferred form, a flexible tube (rubber or plastic) having a number of internal passageways or bores 36 corresponding to the number of pins 18 being employed in the particular system. As shown most clearly in FIG. 1, the conduit 32 is connected to the external portions of the pins 12 by simply slipping it onto the pins with a telescoping type of movement. To obtain a pneumatic impervious connection, it is preferred that the diameter of the bores 36 in the flexible tubing 32 be slightly less than the external diameter of the pins 12, it being understood that the material from which the flexible conduit is manufactured has sufficient "give" to permit such a connection to be made.

Thus far in the description, it will be appreciated that pneumatic pulses generated within the casing 10 will be passed through the hollow pins 12 and into the flexible conduit 32 by which such pulses can be conveyed to the remotely located register box 50 of FIG. 6.

To positively maintain the physical connection between the fluid carrying conduit 32 and the pins 12, and at the same time to prevent the pins 12 from being subjected to mechanical bending stresses when the conduit 32 is flexed, there is provided a clamping arrangement broadly designated 15. In the preferred embodiment of FIGS. 1 through 3, the clamping arrangement 15 is defined by the cooperation of a clamping plate broadly designated 16 in FIGS. 2 through 4 and an integral extension 17 of the walled portion 14. As best seen in FIGS. 1 and 2, the integral extension 17 includes a relatively flat upper surface through which are provided a pair of apertures 20. Integrally provided about the perimeter of the upper surface is a depending skirt 19 provided at its lower extremity (as best seen in FIG. 3) with a recessed shoulder-like receiving surface 21 the purpose of which is to seat a peripheral flange-like portion 23 of the clamping plate 16 in a manner to be further described.

The front portion 25 of the depending skirt 19 includes a cut out or removed portion 27 which as best seen in FIG. 3 is, generally, rectangular in nature with the exception of being provided with an upper edge surface 29 corresponding in configuration to approximately one half the cross-sectional profile of the tubular conduits 32 which, in a manner to be further described, will reside therein. Additionally, and as best seen in FIG. 1, the inner confronting faces 31 of the depending skirt portion 19 which define the opposite vertical edges of the removed section 27 each include a vertical slot or guideway 33 which receive vertically situated outstanding tab-like portions 35 of the clamp plate 16 when the clamping arrangement 15 is assembled.

As best seen in FIGS. 3 and 4, the clamping plate 16 includes a flat base portion 37, the outer peripheral portion of which defines the aforementioned flange like surface 23 which is to be seated on the recessed support surface 21 defined on the lower extremity of the depending skirt 19 of the extension 17. Upstanding from the base portion 37 is a pair of integral, generally cylindrical protuberances 39 having longitudinal passageways 41 therethrough. Disposed on the under surface of the base portion 37 and secured thereto by appropriate means such as cement or spot welding is a somewhat smaller plate 43 having a pair of internally tapped openings 45 axially aligned with the passageways 41.

As best seen in FIGS. 3 and 4, integrally built-up on the leading edge 47 of the flat base portion 37 of the clamping plate 16 is an upstanding partition plate 49 the upper longitudinal edge 51 of which is configured to resemble approximately one half of the cross sectional profile of the conduit 32. The opposite vertical edges of the partition plate 49 are provided with the aforementioned tab portions 35 which are received by the aforementioned guiding slots 33 provided in the confronting faces 31 of the depending skirt 19.

In assembling the clamping arrangement of FIGS. 1 through 4, meter casing 10 is preferably held inverted (in the manner shown in FIG. 1) and the conduit 32 is connected to the externally extending portions of the pins 12 (by inserting the pins in the bores 36) with the body of the conduit 32 laid into the "bed" defined by the previously mentioned appropriately configured upper edge 29 of the cut out or removed portion 27 of the front surface 25 of the depending skirt 19.

Next, the clamping plate 16 is matingly fitted to the integral extension 17 with the proper seating alignment being established when the aforementioned peripheral flange portion 23 of the base portion 37 thereof is situated on the recessed receiving surface 21 provided on a lower extremity of the depending skirt 19. Simultaneously, the proper fit is established by means of the aforementioned tab like projections 35 of the upstanding partition plate 49 of the clamping plate 16 being slidably received within the aforementioned slots 33 provided on the confronting surfaces 31 of the skirt 19. It will be appreciated, and as best seen from FIG. 3, that when the clamping plate 16 is properly seated, the conduit 32 will be snugly and frictionally seated within an almost identically configured aperture defined by the mating of the edges 29 and 51 provided in the cut-out or removed section 27 and upstanding partition plate 49 respectively.

To secure the thus defined arrangement, a pair of bolts 53 (only one of which is shown in FIG. 2) are inserted through the apertures 20 in the upper surface of the extension 17; through the upstanding protuberances 39 of the clamp plate 16; and into screw threaded engagement with the internally tapped apertures 45 provided in the aforementioned lower plate 43.

Thus, when the bolts are tightened up, the conduit will be firmly clamped in place in the aforementioned aperture (defined by the edges 29 and 51), such that during normal usage, it is unlikely that the conduit 32 will ever become disconnected from the pins 12. Equally as important, it should be appreciated that the actual clamping surfaces defined by the edges 29 and 51 lie in a plane (represented by the numeral 55 of FIG. 1) which is located beyond the outermost extremities 57 of the pins 12. Consequently, if there should be flexing of the conduit 32, the clamping edges 29 and 51 will prevent any such flexing from being applied to that portion of the conduit 32 which resides within the chamber defined by the depending skirt 19. As a result thereof, no mechanical stresses will ever be applied to the pins 12 which are manufactured of a somewhat fragile material such as thin-walled brass.

As noted previously, it is a particularly advantageous feature of the instant invention to provide the above described clamping arrangement with a certain degree of "over clamp" which in a more positive fashion establishes the desired connection of the conduit 32 to the pins 12. This is accomplished in the instant invention by choosing the dimensions designated $a$ and $b$ in FIG. 3 such that the overall vertical dimension of the aperture defined by the edges 29 and 51 is somewhat less than the actual thickness of the conduit 32 (shown as dimension $c$ in FIG. 2). Thus, when the bolts 53 are tightened up during the assembly, the edges 29 and 51 will actually physically "dig" into the conduit 32 to positively prevent any lateral displacement of the conduit 32 relative to the pins 12. Of course, the overall thickness of the conduit 32 is sufficiently greater than the diameter of the internal passageways 36 thereof that this over-tightening feature will in no way block or choke such passageways.

Turning to FIGS. 5 and 7, there is illustrated the connection of the opposite end of the fluid conduit 32 to the previously mentioned register box broadly designated 50. It should be noted, and it will become more apparent, that although the clamping arrangement used at the register box 50 appears structurally different than the clamping arrangement 15 used on the meter box 10, it does involve in reality, an application of the same principles which are employed for the connection at the meter box. It is hoped, therefore, that the detailed showing of the register box connection will illustrate the fact that the principles of the instant invention can be practiced in a variety of structural embodiments and furthermore that if desired one or more of such variations may be applied in a single pneumatic system, for example the pneumatically operated remote metering system discussed herein.

With specific reference to FIGS. 5 through 7, the register box 50 preferably comprises a casing portion 55 and a generally L shaped cover portion 57. The casing portion 55 has an open bottom end defined by a generally U shaped (in planar section) inwardly directed flange like lip or ledge 59, the bite portion 61 of which is provided with a centrally disposed notch 63. Internally of the exterior casing 55 and integrally formed therewith is an interior housing 65 lower edge surfaces 67 of which are slightly spaced from the aforementioned inwardly directed ledge 59 to define channel ways 69 therebetween.

It will be appreciated that the interior housing 65 encloses the necessary pressure response apparatus and mechanical counter responsive thereto (not shown) for providing an indication of the rate of water flow taking place at the meter 10 of FIG. 1. Consequently, the housing 65 includes a pair of hollow pins 71 passing through a rear walled portion 73 thereof. Like the pins 12 of FIG. 1 the pins 71 include circumferential irregularities 75 which prevent lateral displacement and aid in establishing an air tight arrangement. Preferably, such pins are also inserted in the walled portion 73 by the previously described ultrasonic welding technique.

The cover 57 includes an upstanding face portion 77 which includes a pair of apertured embossments 79 and a window 81 for viewing the wheels of a counter (not shown) which would be located within the internal housing 65. The inwardly directed planar leg 83 of the cover 57 includes along its forward edge 85 thereof an elongated notch 87 which in a matter to be further described cooperates with the previously described notch 63 to define a passageway for the conduit 32 when the cover 57 is secured to the casing 55.

In assembling the modification illustrated in FIGS. 5 through 7, the conduit 32 is connected to pins 71 and the outstanding planar leg 83 of the cover 57 is slid into the guideways 69 until the planner surface 77 of the cover 57 lies in abutting contact with the front face 65' of the internal housing 65. At that time, a pair of bolts 89 are passed through the embossments 79 into screw threaded engagement with tapped apertures 91 provided in the surface 65'.

Once the cover 57 reaches its intended position, the edge-like surfaces of the elongated notches 63 and 87 will together define a conduit bearing aperture the edges of which will grasp the conduit 32 in the manner suggested in FIG. 6. The clamping arrangement thus established will prevent the conduit 32 from being pulled off the pins 71 during normal usage. Also, it will be appreciated that the clamping established by the notches 63 and 87 is, like the arrangement of FIG. 1, located beyond the outermost extremity 93 of the pins 7. Accordingly, even if there should be flexing of the conduit 32 outside of the casing 55, such flexing will not be applied to the portion of the conduit within the casing 55 and accordingly, no mechanical stresses will be applied to the somewhat fragile pins 71.

Preferably, and like the arrangement of FIGS 1 through 3, the depths of the elongated notches 63 and 87 are chosen such that the passageway defined thereby will be of a lesser dimension than the overall thickness of the conduit 32 and, accordingly, such conduit will be bitingly engaged by the respective edges when the cover 57 is secured in place.

Thus, there has been described a connecting arrangement which may be practiced in the various forms one or more of which may have application in a variety of pneumatic systems. Accordingly, it is to be undestood that although the invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

I claim:

1. A connecting arrangement for conveying fluid through a wall; said connecting arrangement comprising:
at least one fluid carrying hollow pin passing through said wall; said pin having a portion thereof extending externally of said wall;
a fluid carrying conduit connected in fluid communication with said portion of said pin;
clamping means located beyond the outermost extremity of said portion of said pin for maintaining the connection of said conduit and said portion of said pin and for preventing mechanical stress from being applied to said pin;
wherein said clamping means comprises:
a first member having a notch therein said first member being fixed relative to said wall;
a second member having a notch therein, said second member being removably aligned with respect to said first member such that the notches of said first and second members define a conduit bearing passageway through which said fluid carrying conduit passes; the internal edges of the thus defined passageway frictionally engaging said conduit to help prevent the lateral displacement thereof; and
means for drawing said first member and second member toward one another; and
wherein said internal edges of said thus defined passageway are located beyond the outermost extremity of said portion of said pin.

2. The connecting arrangement of claim 1 wherein said pin includes a circumferential irregularity disposed intermediate its ends thereof, said irregularity being embedded in said wall.

3. The connecting arrangement of claim 1 wherein said pin and said wall are shrink-fitted with respect to one another.

4. The connecting arrangement of claim 1 wherein said fluid carrying conduit comprises a length of flexible material having an internal passageway therethrough; said portion of said pin being telescopically situated within one end of the internal passageway of said conduit.

5. The connecting arrangement of claim 4 wherein said pin includes a circumferential irregularity disposed intermediate its ends thereof, said irregularity being embedded in said wall.

6. The connecting arrangement of claim 1 wherein said notches of said first and second members have predetermined depths so chosen that the conduit bearing passageway defined thereby will have "thickness" dimension less than the thickness of said conduit, whereby said edges will embed themselves into said conduit.

7. The connecting arrangement of claim 1 wherein said first member is integrally connected to said wall, and said second member is removably secured to said first member with the notches of said first and second members lying in the same plane.

8. The connectng arrangement of claim 7 wherein said first member includes an upper flat surface including a front edge and side edges from which depends a circumventing skirt portion, a forward portion of said skirt portion depending from said front edge of said upper flat surface including said notch of said first member.

9. The connecting arrangement of claim 8 wherein said second member includes:
a generally planar base portion which is seatingly received by a recessed support surface provided in the lowermost extremity of said depending skirt portion;
said second member further including an upstanding partition plate within which is located the notch of said second member.

10. The connecting arrangement of claim 9 wherein confronting faces of the forward portion of said skirt portion which in part define the notch of said first member include elongated slots; and
opposite edges of said partition plate of said second member include outstanding tab-like portions which are guidingly received by said elongated slots.

11. The connecting arrangements of claim 1 wherein said first member comprises one partial end surface of a casing; and
said second member comprises a cover member removably secured to said casing with the notches of said first and second members lying in different planes.

12. The connecting arrangement of claim 11 wherein said casing includes internally located guideways which slidably receive said cover member.

13. The connecting arrangement of claim 11 wherein said partial end surface comprises an inwardly directed ledge one edge of which is provided with the notch of said first member and said cover member includes a planar portion on a forward edge of which is provided the notch of said second member;

whereby when said cover member is secured to said casing the notches of said first and second members define said conduit bearing passageway, the internal edges of which frictionally engage said conduit.

14. The connection arrangement of claim 13 wherein said notches of said first and second members have predetermined depths so chosen that the conduit bearing passageway defined thereby will have "thickness" dimension less than the thickness of said conduit, whereby said edges will embed themselves into said conduit.

15. The connecting arrangement of claim 11 wherein said notches of said first and second members have predetermined depths so chosen that the conduit bearing passageway defined thereby will have "thickness" dimension less than the thickness of said conduit, whereby said edges will embed themselves into said conduit.

16. A connecting arrangement for conveying fluid from a location within a meter casing to a location within an internal housing provided within a remotely located register box; said connecting arrangement comprising:

a first fluid carrying hollow pin passing through said meter casing; said first pin having a portion extending externally of said casing;

a second fluid carrying hollow pin passing through said internal housing of said register box; said second pin having a portion extending externally of said internal housing;

a fluid carrying conduit connected at opposite ends thereof to said external portions of said first and second pins;

first clamping means located beyond the outermost extremity of the external portion of said first pin for maintaining the connection of said conduit and said first pin and for preventing mechanical stress from being applied to said first pin;

second clamping means located beyond the outermost extremity of the external portion of said second pin for maintaining the connection of said conduit and said second pin and for preventing mechanical stress from being applied to said second pin;

wherein said first and second clamping means each comprise:

a first member having a notch therein said first member of said first and second clamping means being fixed with respect to said casing and housing respectively;

a second member having a notch therein, said second member being removably aligned with respect to said first and second members define a conduit bearing passageway through which said fluid carrying conduit passes; the internal edges of the thus defined passageway frictionally engaging said conduit to help prevent the lateral displacement thereof;

means for drawing said first member and second member toward one another; and wherein said internal edges of the conduit bearing passageways of said first and second clamping means are located beyond the outermost extremity of said external portions of said first and second pins respectively.

17. The connecting arrangement of claim 16 wherein said notches of said first and second members of said first and second clamping means have predetermined depths so chosen that the respective passageways defined thereby will have "thickness demensions" less than the thickness of said conduit.

18. The connecting arrangement of claim 16 wherein the first member of said first clamping means is integrally connected to said meter casing, and the second member of said first clamping means is removably secured to the first member of said first clamping means with the notches of the first and second members of said first clamping means lying in the same plane.

19. The connecting arrangement of claim 18 wherein the first member of said second clamping means comprises one partial end surface of said register box; and said second member of said second clamping means comprises register box cover removably secured to said register box with the notches of said first and second members of said clamping means lying in different planes.

References Cited

UNITED STATES PATENTS

| 1,042,370 | 10/1912 | Schwed | 285—114 |
| 1,809,896 | 6/1931 | Hartmann | 285—222 X |
| Re23,800 | 3/1954 | Dufour | 73—272 X |
| 2,787,481 | 4/1957 | Buschow | 285—381 X |
| 2,858,983 | 11/1958 | Holtz | 235—91 |
| 3,142,502 | 7/1964 | Luther | 285—242 |
| 3,323,813 | 6/1967 | Gordon | 285—137 |
| 3,453,007 | 7/1969 | Roland | 285—137 |
| 3,457,359 | 7/1969 | Soucy | 285—243 X |

RICHARD C. QUEISER, Primary Examiner

C. E. SNEE III, Assistant Examiner

U.S. Cl. X.R.

285—243